April 11, 1944.   W. N. GOODWIN, JR   2,346,572
ELECTRICAL INSTRUMENT
Filed July 16, 1942

Inventor:
William Nelson Goodwin, Jr.,

By Pierce & Scheffler,
Attorneys.

Patented Apr. 11, 1944

2,346,572

UNITED STATES PATENT OFFICE 2,346,572

ELECTRICAL INSTRUMENT

William Nelson Goodwin, Jr., Newark, N. J., assignor to Weston Electrical Instrument Corporation, Newark, N. J., a corporation of New Jersey Application July 16, 1942, Serial No. 451,239

4 Claims. (Cl. 171—95)

This invention relates to electrical indicating instruments of the multi-revolution type and more particularly to the novel construction of the upper bridge that carries one of the bearings in which the staff of the movable system rotates.

Revolution indicators, synchroscopes and various other similar instruments are provided with scales graduated and figured throughout the entire 360 degrees. The movable system is mounted on a staff which rotates within two jeweled bearings to reduce friction to a minimum. One bearing is conveniently inserted in the base of the instrument and the upper bearing is carried by a bridge which is supported on a fixed member of the instrument by suitable studs. Jewels having a V shaped recess have been found to be most satisfactory for instrument use. It is obvious that the use of such jewels makes it necessary to position the upper bearing above the rotatable pointer, hence the bridge structure must be designed so as not to interfere with the deflection of the pointer over the entire 360 degrees. At present, this is accomplished by providing a metal bridge diametrically positioned across the face of the instrument and supported by studs lying on a diameter somewhat greater than that described by the tip of the pointer. The bridge, therefore, obscures two sections of the instrument scale, which is objectionable.

An object of this invention is the provision of an indicating instrument of the multi-revolution type wherein the pointer and scale markings are visible throughout the entire 360 degrees.

Another object of this invention is the provision of an electrical instrument including a pointer rotatable throughout one or more complete revolutions and in which the upper bearing is carried by a transparent bridge member.

Still another object is the provision of an indicating instrument having an effective scale range of 360 degrees comprising an outer glass cover of the usual type and an inner, transparent member extending across the face of the instrument, the inner member carrying one of the instrument bearings.

These and other objects and advantages will be apparent from the following description when taken with the accompanying drawing which illustrates one embodiment of my invention. It is to be understood that the drawing is merely for purposes of illustration and is not to be construed as defining the scope and limits of the invention, reference being had, for this purpose, to the appended claims.

In the drawing wherein like characters identify like parts in the several figures.

Figure 2:
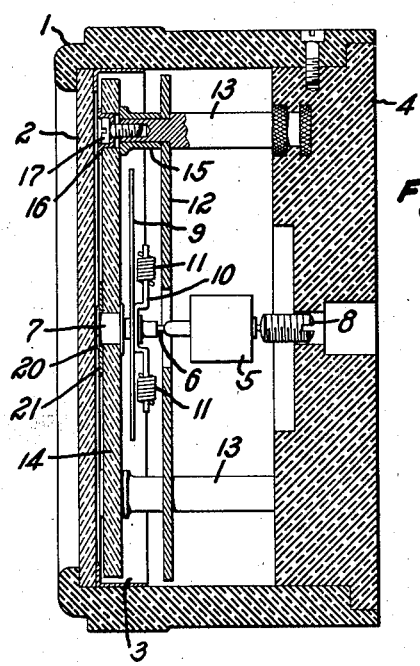
Fig. 2 is a vertical, cross-sectional view taken through the center of Figure 1, parts of the instrument being omitted.

Referring now to the drawing, the numeral 1 identifies the cylindrical instrument case carrying a glass window 2 which is retained in position by the bezel 3. The case is usually made of plastic material as is also the base 4 which supports the component elements of the instrument mechanism. As shown in Figure 2, the movable system comprises a member 5 affixed to a staff 6 which is free to rotate in the jeweled bearings 7, 8. The member 5 is merely illustrative and may comprise a wire wound movable coil, an iron vane or a magnetized rotor depending upon the intended use of the particular instrument; and the corresponding permanent magnet or field coils are not shown as they are well known in the art and are not pertinent to this invention.

Secured to the staff 6 are the pointer 9 and the cross arm 10 which carries the adjustably positioned weights 11 by means of which the movable system may be balanced. A scale plate 12, carrying suitable markings, is supported on three metal studs 13 which are molded in the base 4, only two of the said studs being shown in the drawing.

It is preferable to provide a central hole in the scale plate to permit insertion and positioning of the member 5 after the scale plate has been located on the supporting studs 13. Thus, the movable system may be assembled and balanced on a suitable fixture and inserted into position as a unit.

The upper bearing 7 is carried by the bridge comprising a circular, transparent plate 14, that is supported on the studs 13 and spaced from the scale plate by the shouldered bushings 15. The plate 14 may be made of glass, plastic or other suitable material. Cup washers 16 are drawn into engagement with the outer surface of the plate 14 by screws that are threaded into the studs 13, the transparent plate 14 and the scale plate 12 being thereby firmly held in proper relative position.

Figure 3:
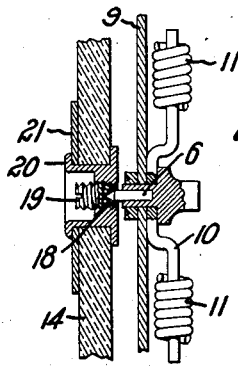
Fig. 3 is a fragmentary, enlarged sectional view showing the location of the jeweled bearing in the transparent bridge.

As illustrated in Figure 3, the V shaped jewel 18 is retained in the screw 19 which is threaded into the bushing 20, and the bushing 20 is spun over the metal retaining washer 21 thereby forming a rigid support for the axially alined bearing. The construction permits easy adjustment of the screw 19 to provide a desired amount of play between the jewel 18 and the pivot 6.

Figure 1:
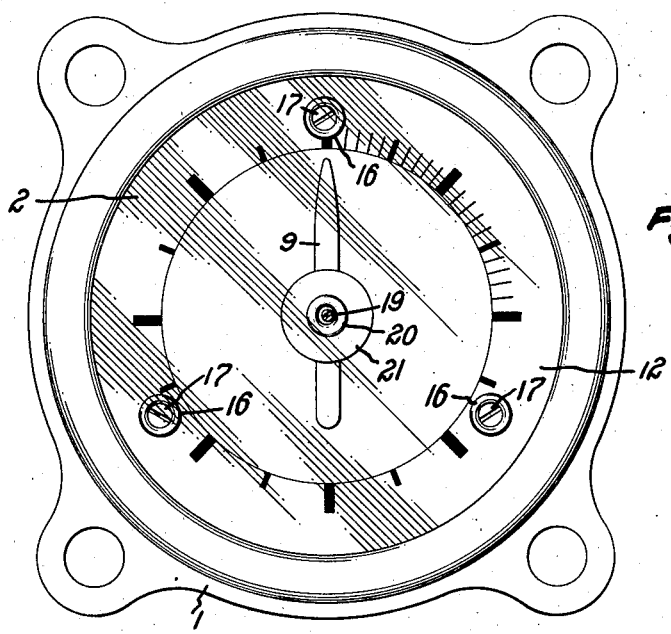
Fig. 1 is a plan view of an instrument embodying the invention.

As illustrated in Figures 1 and 2, the supporting studs 13 are shown somewhat removed from the inner wall of the case 1 for purposes of clarity but it is obvious that the studs may be further removed from the axis of the instrument to permit the use of a longer pointer. The instrument parts are assembled on the base 4 in the usual manner and, after the final testing and/or calibration, the cylindrical shell 1 and cover glass 2 are slipped over the instrument and secured to the base. The instrument is thus effectively protected against the entrance of dirt and moisture, and the outer bearing is protected against damage by the cover glass 2.

It is to be noted that by making the upper bridge of transparent material, in accordance with this invention, the entire scale is plainly visible from the front of the instrument and the pointer deflection is conveniently readable throughout the entire 360 degree circle. No shadows or reflections interfere with the reading as the transparent plate 14 extends to or beyond the graduations of the scale plate. The exact angular length of the graduated scale is not an essential feature of the invention as the described construction may be employed to advantage in instruments having a scale length of substantially less than 360°.

It is to be noted that the transparent bridge member 14 need not be a circular plate but may take the general shape of the instrument case. Thus, when used in a rectangular instrument the bridge member may take the form of a square or rectangle. Also, the bridge member need not overlie the entire instrument scale but may comprise a flat bar extending diametrically across the instrument and of sufficient width to support the upper instrument bearing 7.

Having now described my invention and a preferred form of construction, variations and modifications will be apparent to those skilled in the art. Such variations and modifications may be made without departing from the spirit and scope of the invention as set forth in the following claims.

I claim:
1. An electrical measuring instrument comprising a case having at its opposite ends an outer window and a base, a scale plate, posts secured to said base and carrying said scale plate, a rotatable movable system extending through said scale plate and including a pointer movable over the same, an end bearing carried by said base for supporting one end of said moving system, and a bridge member supported from said base and carrying a second bearing for the other end of said moving system; said bridge member being a transparent plate positioned between said case window and said pointer.

2. A measuring instrument as recited in claim 1, wherein said bridge member is supported on the posts that carry the scale plate.

3. A measuring instrument as recited in claim 1, wherein an internally threaded bushing is mounted on said transparent bridge member, and said second bearing is carried by a screw that is threaded in said bushing.

4. A measuring instrument as recited in claim 1, wherein said scale plate bears an arcuate graduated scale having a length of more than 180°, and said transparent bridge member extends radially beyond said arcuate scale.

WILLIAM NELSON GOODWIN, Jr.